(12) United States Patent
Keeling

(10) Patent No.: US 12,502,742 B2
(45) Date of Patent: Dec. 23, 2025

(54) PARALLEL-KINEMATIC 4-AXIS POSITIONER

(71) Applicant: Maxwell Lawrence Keeling, Lancaster, NY (US)

(72) Inventor: Maxwell Lawrence Keeling, Lancaster, NY (US)

(73) Assignee: Magtrol, Inc., Buffalo, NY (US)

( * ) Notice: Subject to any disclaimer, the term of this patent is extended or adjusted under 35 U.S.C. 154(b) by 325 days.

(21) Appl. No.: 18/469,047

(22) Filed: Sep. 18, 2023

(65) Prior Publication Data

US 2024/0091894 A1    Mar. 21, 2024

Related U.S. Application Data

(60) Provisional application No. 63/408,337, filed on Sep. 20, 2022.

(51) Int. Cl.
*B23Q 3/00* (2006.01)
*B23Q 1/25* (2006.01)

(52) U.S. Cl.
CPC ..................................... *B23Q 1/25* (2013.01)

(58) Field of Classification Search
CPC ... B23Q 1/26; B23Q 1/25; B23Q 1/03; B23Q 3/00; B23Q 3/154
See application file for complete search history.

(56) References Cited

U.S. PATENT DOCUMENTS

| 5,197,393 | A | * | 3/1993 | Yeakle | A47B 9/14 |
| | | | | | 108/147 |
| 5,303,035 | A | | 4/1994 | Luecke | |
| 5,896,817 | A | * | 4/1999 | Hancock | A47B 13/081 |
| | | | | | 108/50.01 |
| 6,557,235 | B1 | | 5/2003 | Katz | |
| 8,484,779 | B1 | * | 7/2013 | Bradwell | A61G 13/0027 |
| | | | | | 5/606 |

(Continued)

OTHER PUBLICATIONS

Moog Space and Defense Group, "Moog Hexapods Datasheet, form 500-908 0920", (2020) https://www.moog.com/content/dam/moog/literature/sdg/space/vibration-control/moog-hexapodsdatasheet.pdf.

(Continued)

*Primary Examiner* — Lee D Wilson

(57) ABSTRACT

A 4-axis positioner comprising two 2-axis assemblies sharing a common frame, with a platform connected between them. Each 2-axis assembly comprises a fixed assembly secured or integral to the common frame, two input assemblies secured to the fixed assembly by independently actuated linear motion connections, and a translation assembly secured to the input assemblies by additional linear motion connections. The connections between the input assemblies and the fixed assembly are parallel with one another, and the connections between the input assemblies and the translation assembly are both non-parallel from the connections to the fixed assembly, and non-parallel from one another. The translation assemblies move in two linear axes by common or opposing motion of the input assemblies. The platform is connected to each translation assembly by joints, and moves in two linear axes by common motion, and two rotational axes by opposing motion, of the translation assemblies.

5 Claims, 4 Drawing Sheets

(56) References Cited

U.S. PATENT DOCUMENTS 10,746,928 B2    8/2020    Wiley
2015/0068432 A1*    3/2015    Wagner .............. A47B 21/0314
                                                                                             108/3

OTHER PUBLICATIONS

Thor Labs, "Compact 5-Axis Pitch, Yaw, and Translation Stage", (2023) https://www.thorlabs.com/newgrouppage9.cfm?objectgroup_id=7850.
Pi, "P-158-P-528-P558-Datasheet", (2022) https://www.physikinstrumente.com/en/products/nanopositioning-piezo-flexure-stages/multi-axis-piezo-flexure-stages/p-518-p-528-p-558-piezo-z-tip-tilt-stage-201510#downloads.
Standa, "8MTP116—Motorized Rotation and Tilt Stage" (2020) https://www.standa.It/products/catalog/motorised_positioners?item=296.
Optimal Engineering Systems Inc. "Hollow Core XY-theta; Alignment Stage" (2015) https://www.motioncontrol.biz/alignment-stages/HBT01-250.htm.

* cited by examiner

PARALLEL-KINEMATIC 4-AXIS POSITIONER

CROSS REFERENCE TO RELATED APPLICATIONS

This application claims the benefit of provisional patent application No. 63/408,337, filed 2020 Sep. 20 by the present inventor.

BACKGROUND

The following is a tabulation of some prior art that presently appears relevant:

U.S. Patents

| Patent Number | Kind Code | Issue Date | Patentee |
| --- | --- | --- | --- |
| 10,746,928 | B2 | 2020 Aug. 22 | Wiley |
| 6,557,235 | B1 | 2003 May 6 | Katz |
| 5,303,035 | A | 1994 Apr. 12 | Luecke |

Nonpatent Literature Documents
Moog Space and Defense Group, "Moog Hexapods Datasheet, form 500-908 0920", (2020) https://www.moog.com/content/dam/moog/literature/sdg/space/vibration-control/moog-hexapods-datasheet.pdf This relates to positioning mechanisms, positioners, stages, manipulators, motion systems, or platforms. A very wide variety of positioning systems are used throughout science and industry to meet the needs of varying applications. Examples of positioning systems include: the work table inside a CNC machining center; a microscope slide adjustment stage; a Gough-Stewart platform (i.e. hexapod) used for orienting a telescope. Such things as a jointed robotic arm can also be thought of as a type of positioner.

The type, design, and implementation of a positioner depends the needs of the application. No positioner type or design is ideal for all situations; balance must be struck between many qualities, including: the number, type and disposition of motion axes; range of motion of these axes; payload capacity; speed; precision; operational environment; operational life; system size and shape; and cost. Every application is best served by a particular balance of these characteristics.

One potential application for positioners is the alignment of rotary test equipment. In such testing, it is generally necessary to precisely connect, or couple, rotary shafts. A typical test setup would require the shaft of a dynamometer to be coupled to the shaft of a motor. Misalignment between such rotating shafts can cause inaccurate test results, vibration, damage or accidents.

The alignment of rotating shafts requires that all shafts share a common axis of rotation. The axis of a rotating body is a virtual line in three-dimensional space. Therefore, in essence, the alignment of rotating shafts requires at least two lines to be made coincident in space. To move a line to any position in space, four axes of motion are required: two translational and two rotational. It is also necessary that the two axes of rotation be around those same two axes of translation. Accordingly, a positioner for the alignment of rotary test equipment should be capable of motion in two rotational and two translational directions as described above.

In practice, a positioner for rotary test equipment has additional requirements. The precision of motor alignment is quite important. Typically, shaft couplings can tolerate parallel misalignment under 50 µm, and angular misalignment up to 2°. However, better alignment than this is desirable, especially at higher test speeds. The precision requirements for such a positioner are similar to those found with production machine tools.

The size of the positioning system for this application is important, as it must fit into many possible test setups, and must be ergonomically accessible for users to mount test articles to it. A lower profile is generally beneficial, as this allows the greatest vertical space for the various set up blocks or fixtures that may be required.

Rotary equipment testing also involves a variety of unique setups, and may involve equipment heavy enough to be difficult to lift by hand. It also may create high loads and vibration, and there is a significant possibility of unexpected high loads or impact. Therefore, a positioner for this application should ideally be robust to accidental impact, and feasible to construct with a wide range of payload capacities.

Finally, the cost of the system must be kept to a level that is reasonable within the industry. Our experience is that none of the existing technologies can meet all of the other requirements at a cost acceptable to most potential users.

Linear and rotary stages of the type used for metrology, microchip processing and optics, are generally very precise, but expensive. The payload capacities are most often below those required for rotary test equipment. When multiple axes of translation and rotation must be stacked, the resulting assemblies are also bulky.

U.S. Pat. No. 10,746,928 to Wiley et al. (2020) describes a positioning method using parallel-kinematic principles to achieve up to six axes of motion in a compact device. However, while this method may be well suited to the intended purpose of fiber alignment, the method relies on the use of prismatic actuators, which make a point contact on the top plate, and magnets for retention of the top plate, which would not provide the positive retention and payload capacity for mechanical testing.

U.S. Pat. No. 5,303,035 to Luecke at al. (1994) describes a micropositioner able to achieve up to 6-axis motion in a compact form. This design uses parallel-kinematic principles as well. It utilizes point contacts by bearing balls and springs for holding the moving parts together. This design is limited in scalability for load carrying and range of motion due to its reliance on these elements, so would not be well suited to rotary equipment testing.

Machine tool motion systems, including XY tables, and rotary (or "$4^{th}/5^{th}$ 5 axis" tables), are designed for continuous use inside equipment such as milling machines and lathes. These types of multi-axis systems are very robust as well as accurate, but very heavy, large, and expensive, especially when stages are combined to create multi-axis systems.

U.S. Pat. No. 6,557,235 to Katz et al. (2003) describes a bi-axial coplanar apparatus with use cases in manufacturing. The apparatus uses parallel-kinematic principles to achieve 2-axis translational motion. However the design has some limitations: First, it has no inherent ability to accommodate rotation without adding additional stages. The mechanism relies on linkages, which results in varying load carrying capacity as the angles of the linkages changes. The ability of the end effector to firmly hold parallel with the base is also dependent on the distance between the parallel linkage connections, and also varies depending on the angle of the linkages. The apparatus would be bulky and heavy relative to the required range of motion in the context of rotary equipment testing.

Stewart platforms, (i.e. hexapod positioners), allow six degrees of freedom in a relatively compact arrangement by virtue of their parallel kinematic operation. They can also be made very precise. However, they are not ideal for every application.

First, they are expensive. Even if the application does not require six degrees of freedom, a Stewart platform inherently requires six actuators and drives to function, which increases cost.

Second, high-load capacity Stewart platforms on the market typically utilize linear actuators mounted directly between the base and the mounting platform. This requires the linear actuators to pivot, which requires that power cabling, fluid connections and/or sensor cabling flex during operation. This arrangement also increases the height of the platform, making it less compact, and taller than ideal for integration into a motor test setup.

Third, for some applications the Stewart platform is not ideal in shape. Typically, these systems support circular platforms, a consequence of their inherent mechanism, rather than the large rectangular mounting table that is more useful for motor test setups. Even where a rectangular table is used with a Stewart platform, the actual support of the table will be in a triangular or hexagonal pattern rather than rectangularly supported. In response to this problem, Moog, Inc., a hexapod manufacturer, has developed octopod positioners using similar principles to the Stewart platform but with eight actuators rather than six. However, this necessitates even more actuators, inherently increasing cost, and also creates a kinematically-redundant system, which requires careful coordinated motion to avoid binding, which may increase costs further.

Thus, there is no generally acceptable multi-axis positioning system for the purpose of aligning rotary test equipment in all four axes. As a result, laborious manual methods of equipment alignment using shims are used, to the detriment of efficiency and often alignment accuracy.

SUMMARY

A 4-axis positioner utilizing parallel-kinematic principles to provide two linear axes and two rotational axes of motion. The positioner comprises two similar 2-axis assemblies sharing a common frame, each of which is a parallel-kinematic mechanism wherein the relative linear motion of two input assemblies affects the two-axis translation of a translation assembly by means of linear motion connections disposed at predetermined angles. The input assemblies may be actuated by many means in different embodiments of the device, such as motorized lead screws, or hydraulic cylinders. A platform spans between the two translation assemblies and is connected in a manner able to accommodate rotation. Motion of the translation assemblies in the same directions thus affects two-axis translation of the platform, while opposing motion of the translation assemblies affects two-axis rotation of the platform.

One or more embodiments of the positioner provide the following advantages: a more compact and low profile device able to affect two-linear and two-rotational axes of motion in a combination well-suited for the purpose of alignment; a device in which the aforementioned four-axes of motion is achieved with four actuators only; a device in which the actuators may not be required to rotate with respect to the frame thus reducing wear to power or fluid connections; a device which may utilize many different linear motion technologies, including arrangements with robust areas of contact, scalable to large loads; and the potential for a more economical method of achieving four-axis motion, due to the use of many repeated parts when compared with multi-stage, multi-axis systems, and a lower total actuator count when compared with hexapod systems.

DRAWINGS—REFERENCE NUMERALS

| | |
|---|---|
| 12 | 2-axis assembly |
| 14 | translation assembly |
| 16A/B | first and second input assemblies |
| 18 | fixed assembly |
| 19 | primary linear surfaces |
| 20 | rhomboid plate |
| 21 | secondary linear surfaces |
| 22 | connection block |
| 24 | fixed plate |
| 26 | gib |
| 28 | translation plate |
| 30 | swivel joint |
| 32 | support bearing |
| 40 | base plate |
| 42 | side plate |
| 44 | linear actuator |
| 46 | platform |
| 48A/B | front and rear pins |

DETAILED DESCRIPTION

First Embodiment—FIG. 1 Thru 6

One embodiment of the positioner is illustrated in FIG. 1 thru 6. The following description refers specifically to this embodiment, and should not be construed as limiting the scope of all embodiments. Examples of variations possible in alternative embodiments are discussed following the OPERATION section below.

Figure 1:
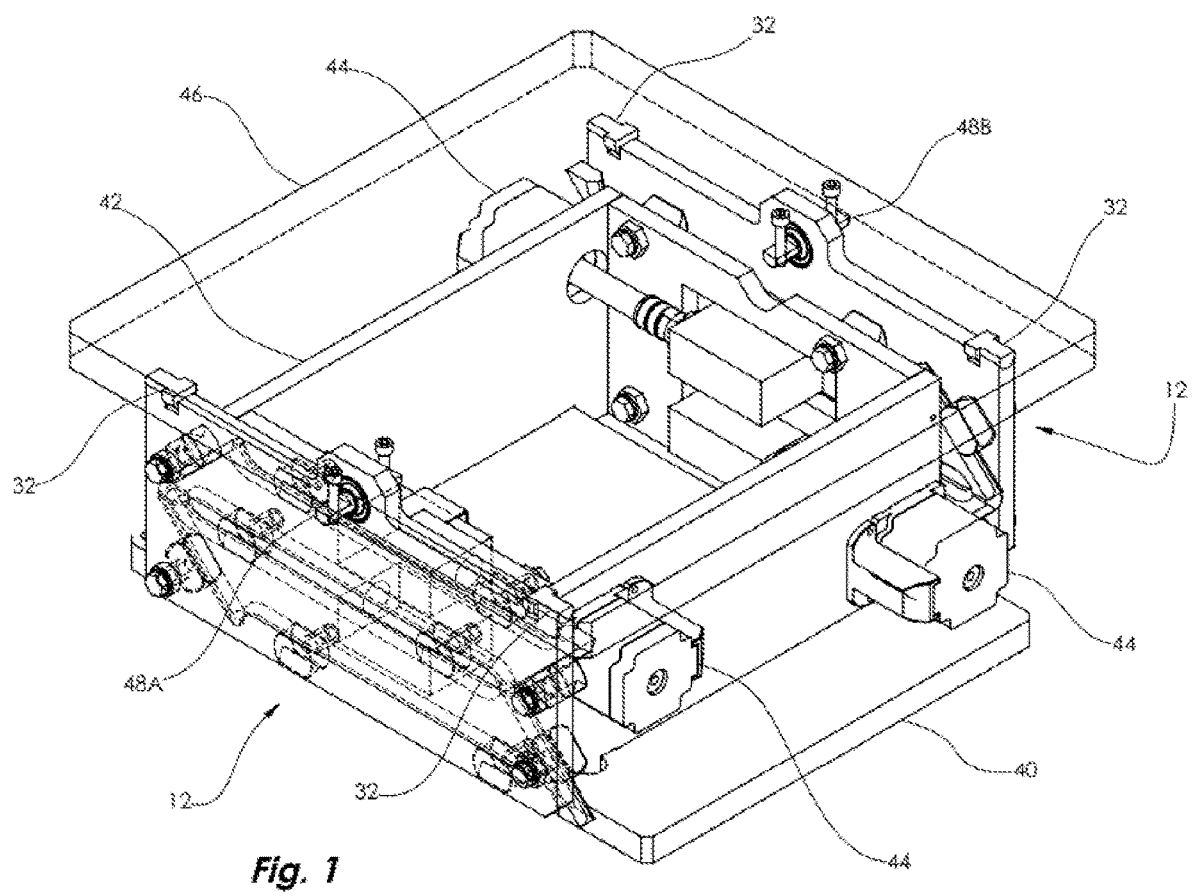
FIG. 1 shows an isometric view of a 4-axis positioner in the center of its range of motion.
Figure 2A:
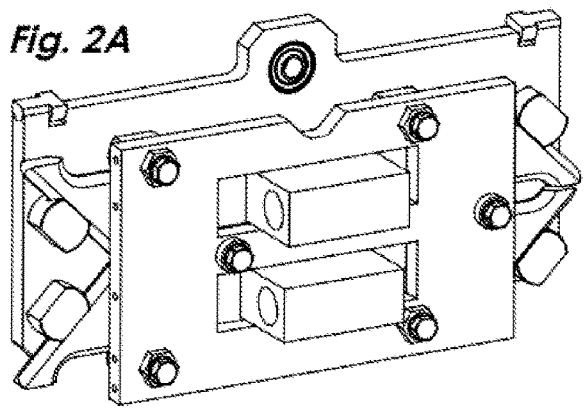
FIG. 2A shows a single 2-axis assembly.
Figure 2B:
FIG. 2B shows an exploded view of a single 2-axis assembly.

Referring to FIG. 1, the positioner has two 2-axis assemblies 12. Referring now to FIGS. 2A & 2B, each 2-axis assembly comprises a translation assembly 14, two similar input assemblies 16A & 16B, and a fixed assembly 18.

The input assemblies 16A & 16B are substantially vertical mirrors of one another, and each input assembly consists of a rhomboid plate 20 that is attached via screws and pins to a connection block 22.

The rhomboid plate 20 is substantially a parallelogram with interior angles not equal to 90 degrees. In this embodiment, the small interior angle of the rhomboid plate is 45 degrees, and the edges of the parallelogram are chamfered, (cut at an angle), to form a V-shaped profile. Each pair of V-shaped parallel edges serves as a linear motion connection surface, with the longer pair designated as the primary linear surfaces 19, and the shorter pair designated as the secondary linear surfaces 21. The rhomboid plate 20 is composed of anodized aluminum alloy.

The connection block 22 has holes to facilitate connection to a linear actuator. The connection block is composed of aluminum alloy.

The fixed assembly 18 comprises a fixed plate 24 and six gibs 26. The fixed plate 24 is composed of aluminum alloy. The fixed plate 24 has attachment points for securing the six gibs 26 into position, and substantially rectangular holes that allow the connection blocks 22 to freely pass.

The gibs 26 are composed of stainless steel with contact surfaces of bonded bearing-grade plastic, such as PTFE. The gibs 26 have a V-shaped cut that forms the aforementioned contact surfaces. The shape of this V-shaped cut is the negative image of the linear surfaces of the rhomboid plate 20. The six gibs 26 are secured to the fixed plate 24 in a manner so as the V-shaped cuts in these six gibs 26 are parallel to one another, and the distance between the V-shaped cuts matches the distance between the primary linear surfaces 19 of the rhomboid plate 20. The gibs 26 may be provided with a mounting that allows adjustment of their position for the purpose of tuning the fit of the linear bearing surfaces; in this embodiment eccentric bushings are utilized for this purpose. Eccentric bushings are commonly used in the same manner for the adjustment of linear V-roller guides in industry and this is well understood by those familiar with linear motion systems commonly in use.

The translation assembly 14 comprises a translation plate 28, four gibs 26, a swivel joint 30, and two support bearings 32. The translation plate 28 is composed of aluminum alloy and has attachment point for securing the four gibs 26 into position. The four gibs 26 are secured at angles and positions to interface with the secondary linear surfaces 21 of the rhomboid plate 20.

The swivel joint 30, (also called "spherical bearing") is of the type manufactured by such companies as Aurora Bearing Company, FK Bearings Incorporated, and AB SKF. This type of bearing has a spherical ball fit within a cylindrical outer race. The ball has a cylindrical hole through its center, and is free rotate within the race. The swivel joint 30 is pressed into the translation plate 28.

The support bearings 32 are cylindrical in shape with a single flat surface, or "D" shaped. They are composed of PTFE. They fit within a semi-circular cut, i.e. cylindrical trough or "halfpipe" in the translation plate 28, and thus are free to rotate. The axis of their rotation is coincident with the center of rotation of the swivel joint 30. A stepped cylindrical shape serves to retain the support bearings axially.

Referring now to FIG. 1, a base plate 40 is fixed to two side plates 42. These side plates 42 support the 2-axis assemblies 12, which are fastened to them by means of their fixed plates 24 being secured by screws to the side plates 42. Thus, the 2-axis assemblies 12 are fixed at either end of the machine, parallel to one another. The group comprising the base plate 40, the two side plates 42, and the two fixed assemblies 18, is rigidly connected together, and in this embodiment forms the common frame of the 4-axis positioner.

Four linear actuators 44 are mounted to the two sideplates 42 via screws. The four linear actuators 44 are disposed to be aligned with the direction of primary linear surfaces 19 of each of the four rhomboid assemblies 16A & 16B and the actuated ends of these linear actuators are connected to the four connection blocks 22 of the rhomboid assemblies 16A & 16B. In this embodiment, the linear actuators 44 are of the type consisting of a stepper motor combined with a lead screw.

Spanning between the 2-axis assemblies 12 is a platform 46. The platform 46 is substantially rectangular in shape, flat on its underside, and composed of aluminum alloy. The platform 46 may have, on its top surface, keyways, tapped holes, or other features used for securing items. The platform 46 rests on the flat face of the support bearings 32. Two substantially cylindrical pins 48A & 48B are fixed to the platform 46 by screws, and pass through the swivel joints 30. These pins are composed of stainless steel. Pin 48A is axially fixed to the spherical ball of its mating swivel joint by means of retaining rings, while pin 48B is free to slide axially within the bore of the spherical ball of its mating swivel joint.

Operation—FIG. 1 Thru 6

Figure 2B:
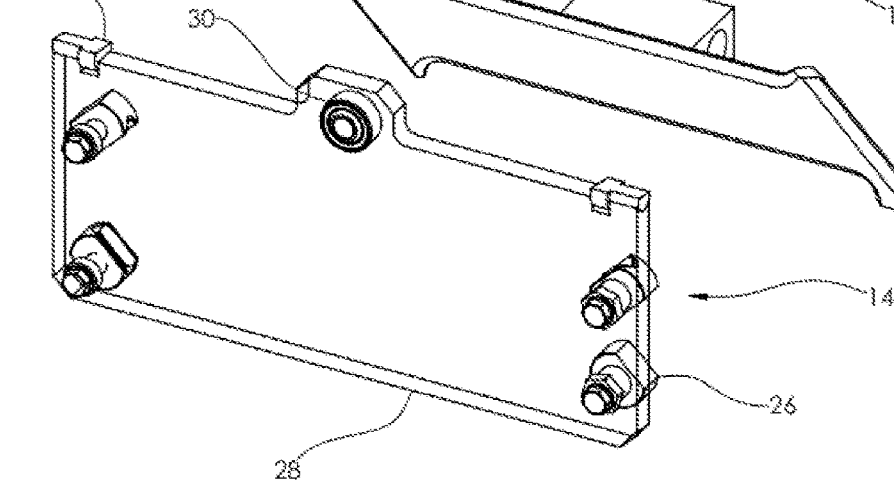

Referring to FIGS. 1 & 2, each linear actuator 44 may push or pull each input assembly 16A & 16B independently. This allows each input assembly 16A & 16B to be translated linearly in the direction of its primary linear surfaces 19.

FIG. 3A thru 3E illustrate how within a 2-axis assembly 12, independent positioning of the input assemblies 16A & 16B can produce two-axis motion of the translation assembly 14. Recall that six of the gibs 26 are mounted to the fixed plate 24, (not shown in FIG. 4A thru 4F) and therefore those six gibs 26 are fixed to the common frame of the machine, and thus are stationary in these figures.

Figure 3A:
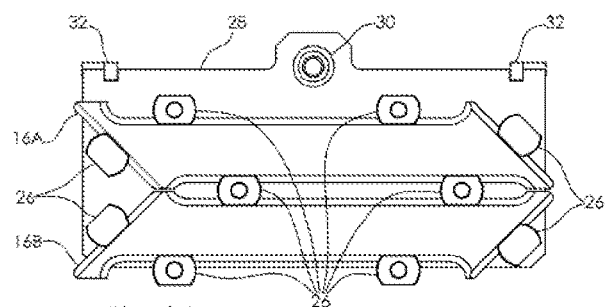
FIGS. 3A to 3E show simplified views of a single 2-axis assembly in multiple positions.
Figure 3B:
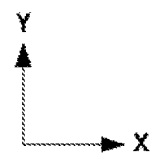
Figure 3B:
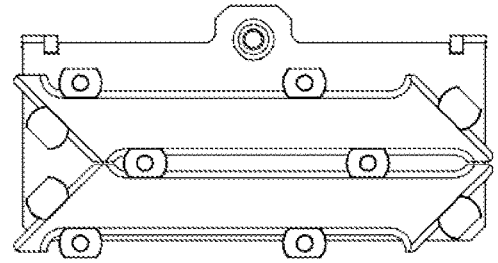
Figure 3D:
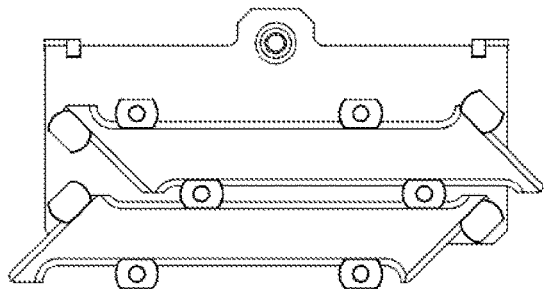
Figure 3C:
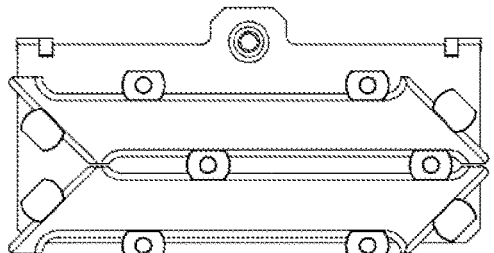
Figure 3E:
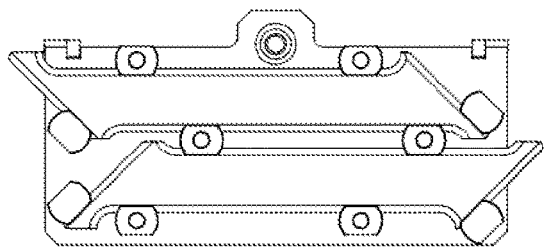

FIG. 3A illustrates a single 2-axis positioner 12 in the middle of its range of motion. Translation of input assembly 16A in the same direction as 16B results in X-axis translation of the translation assembly 14. The limits of X-axis motion are illustrated in FIGS. 3B & 3C. Translation of input assembly 16A in the opposite direction from 16B results in a Y-axis translation of the translation assembly 14. The limits of Y-axis motion are illustrated in FIGS. 3D & 3E. Note that the mean position of input assemblies 16A & 16B determines the X-axis position of the translation assembly, while the difference in position between 16A & 16B determines the Y-axis position of the translation assembly. It is notable as well that angular contact between the four gibs 26 and the rhomboid plates 16A/B maintains the translation assembly 14 in parallel alignment with the fixed assembly 18 as the translation assembly 14 translates in two axes.

FIG. 4A thru 4G illustrate the motion of the 4-axis positioner. By a combination of the individual positions of the two 2-axis assemblies 12, the platform 46 may be positioned in four axes; two translation directions and two rotation directions. These directions will be referred to as "horizontal", "vertical", "pitch", and "yaw".

Figure 4B:
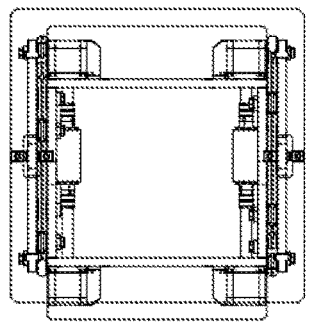
FIGS. 4A to 4G show a 4-axis positioner in multiple positions.
Figure 4A:
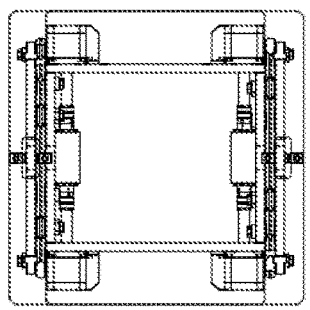
Figure 4C:
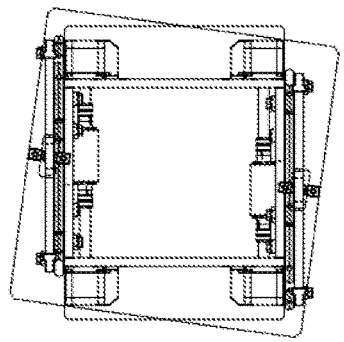
Figure 4D:
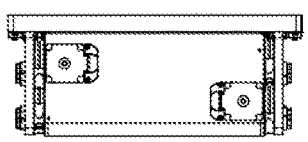
Figure 4E:
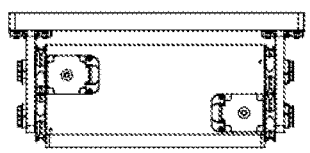

FIGS. 4A and 4E illustrate the positioner in the center of its range of motion. This position is achieved by both 2-axis assemblies 12 being in positions similar to that illustrated by FIG. 3A.

FIG. 4B illustrates the positioner with a horizontal offset. This position is achieved by both 2-axis assemblies 12 being in positions similar to that illustrated by FIG. 3C.

FIG. 4C illustrates the positioner with a yaw rotation. This position would be achieved by one 2-axis positioner 12 being in a position illustrated by FIG. 3C, and the other being in position as illustrated by FIG. 3B.

Figure 4F:
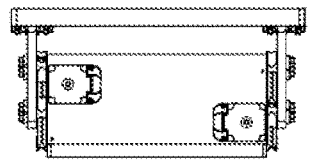

FIGS. 4D and 4F illustrate the positioner at minimum (4D) and maximum (4F) vertical positions. FIG. 4D corresponds to both 2-axis assemblies 12 as per FIG. 3E, while FIG. 4F corresponds to both at FIG. 3D.

Figure 4G:
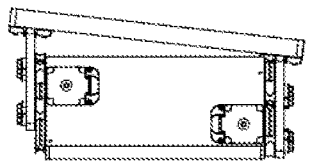

FIG. 4G illustrates the positioner with a pitch rotation. This would be achieved by one 2-axis positioner 12 in position shown in FIG. 3D and the other as in FIG. 3E.

Combined horizontal, vertical, pitch and yaw positions may be achieved by intermediate positioning of the four input assemblies.

When either yaw, pitch, or a combination of yaw and pitch exists, the distance between the swivel joints 30 will change. This occurs because the parallel distance between the translation assemblies 14 is fixed, so when a translation offset between these two assemblies is created, the distance between the swivel joints 30 becomes a longer, diagonal distance. The minimum distance between the swivel joints exists when there is no yaw or pitch. As yaw/pitch increases, this distance increases. In order to allow for this change, pin 48B is free to slide axially inside the ball of its swivel joint. Pin 48A is axially constrained, to prevent the entire platform 46 from sliding freely.

Figure 5A:
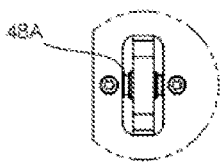
FIGS. 5A to 5D show close-up views of the connections between the platform and the translation assemblies, in different positions.
Figure 5B:
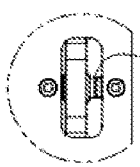
Figure 5C:
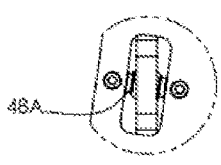
Figure 5D:
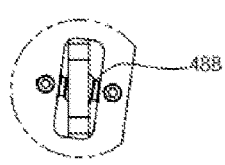

FIGS. 5A and 5B illustrate the pin and swivel joint connection where there is no yaw or pitch in the system. This represents the minimum distance between the swivel joints 30. Note that pin 48B is axially behind the swivel joint. FIGS. 5C and 5D illustrate the connections where a large yaw is present (as in FIG. 4C). Here, the distance between swivel joints has increased, so pin 48B has moved axially to accommodate this change. Pin 48A remains centered, as its position is fixed by retaining rings.

Figure 6:
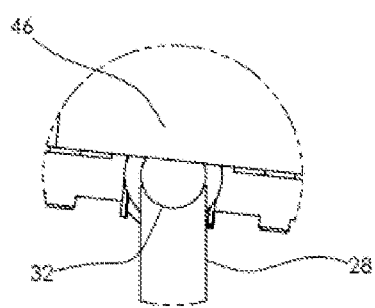
FIG. 6 shows a close-up view of the support bearings between the platform and the translation assemblies.

When pitch exists in the system, such as illustrated in FIG. 4G, the connection between the translation assemblies 14 and the platform 46 must rotate. This rotation is accommodated by the ability of the swivel joint 30 to rotate, as well as the ability of the support bearings 32 to rotate. FIG. 6 illustrates the connection between the support bearings 32, the translation plate 28, and the platform 46. The cylindrical shape of the support bearings fits into a cylindrical "halfpipe" cut in the top edge of the translation plate 28 and therefore the support bearing 32 can rotate in one axis. This allows the bearing's flat top surface to remain in contact with the underside of the platform 46 as the system undergoes pitch changes.

Yaw motion is accommodated by the flat surface of the support bearings 32 sliding along the flat underside of the platform 46.

Therefore, the platform 46 may be adjusted in four axes of motion; two translation and two rotation. The platform may serve as a surface for the mounting of equipment or workpieces, which may be rigidly fixed to the platform, yet by means of this device, be precisely adjusted in these four axes.

ALTERNATIVE EMBODIMENTS—FIG. 1 THRU 6

The illustrated embodiment described above is composed largely of parts made from aluminum alloy, but many other materials are suitable. Any material having suitable rigidity and the ability to be accurately manufactured could be used. For example, steel or stainless steel would be suitable where the application required the greatest strength and durability. Cast iron may be preferable if the parts are to be manufactured by casting, or to increase the vibration dampening properties of the device. Polymers or polymer composites may be used where light weight or high speed motion is desirable.

The input assemblies 16A and 16B may be composed of a single monolithic piece rather than two connected parts 20 and 22. Manufacturing methods such as casting may lend themselves to combining this assembly into a single unified piece. The rhomboid plates 20 may have varying overall proportions or angles.

Because in the complete device they are all rigidly connected together as a common frame, the base plate 40, side plates 42, and fixed plates 24 may be combined into a single piece, in multiple combinations, (40 combined with only 42 or 24, or with both 42 and 24, or 42 and 24 a single piece that is fastened to 40). Combining these parts may be beneficial for the purposes of reducing manufacturing effort in some cases. The side plates 42 may be omitted from the device if the fixed plates 24 or base plate 40 provides suitable mounting and support for the linear actuators 44. In summary regarding the base, side and fixed plates/common frame, any construction that provides linear bearing support for the input assemblies 16, and mounting for the linear actuators 44, would be suitable for the positioner.

The bearing surfaces rigidly connected to the translation plates 28 and to the fixed plates 24 may be integral to those plates, rather than being provided by separate gibs 26. This might take the form of accurately cut and ground slots or angled overhangs cut directly into those plates.

The type of bearing interface between the fixed assemblies 18, rhomboid assemblies 16, and translation assemblies 14 may be varied depending on the application requirements to which the device is used. The illustrated embodiment utilizes an interface of bearing plastic on anodized aluminum, which provides a clean, durable, accurate, and low cost option, but other bearing types are possible. For example, the interface between the bearing surfaces may be cast iron on cast iron mediated by oil, similar to those traditionally found in machine tools. This may provide increased rigidity or vibration dampening. Alternatively, the bearing interface may be mediated by ball or roller bearings, with the bearing surfaces hardened and ground, such as those bearing interfaces found in linear bearings manufactured by Thompson Linear, Bosch Rexroth, THK, and many others. A rolling interface, where the gibs 26 are replaced by rollers, may be beneficial for achieving high speeds.

In any bearing arrangements, the shape of the contact surfaces will necessarily change. Thus, the chamfered edges and V cut gibs may be replaced by box-shaped surfaces, rounded or coved contact areas, or other forms necessary for the type of bearing. In addition, in bearing arrangements such as in the illustrated embodiment where a long bearing surface (19, 21) interface with short bearing surfaces (26), the short bearing surfaces may exist on the input assemblies 16A, 16B. For example, the bearing arrangement may consist of gibs mounted to the input assemblies arranged to slide on longer contact surfaces of the fixed and translation assemblies.

The connection between the translation assemblies 16 and the platform 46 may be accomplished in other ways. The swivel joint 30 may be replaced by a multi-part linkage to allow the necessary two rotational degrees of freedom. This linkage may be constructed with preloaded roller bearings. The connection may also be made using flexible, compliant structures to allow the necessary rotation and variation in distance with angular motion.

The linear actuators 44 may be of many types. Different types of linear actuators will be suited to different applications. For example, the actuators may utilize preloaded ball screws rather than lead screws to increase load capacity and speed and to reduce backlash. The actuators may use servo motors for faster response at higher speeds. The actuators may be replaced by hydraulic cylinders or rollerscrew types for very high load handling. A rack and pinion mechanism, with the rack attached to or cut into the rhomboid assemblies 16 may be used to affect the linear motion. This may be beneficial for achieving high speeds. Pneumatic cylinders may be used to achieve high speeds. A linear motor arrangement may be used to achieve high speed and accuracy. Finally, the positioner can work with unpowered actuators; the adjustment means can be by hand operated cranks.

CONCLUSION, RAMIFICATIONS, AND SCOPE

Some or all embodiments of my 4-axis positioner provide the following advantages:
a) My positioner provides four axes of motion: two translational, and two rotational, in a compact, low profile device.
b) Only four linear actuators are required to achieve four axes of motion, and those four actuators may be identical.
c) The linear actuators are not required to pivot with respect to the base of the machine, and therefore any connecting wiring or tubing to these actuators may not need to accommodate flexing, which will reduce wear and/or decrease cost.
d) My positioner holds the output platform securely and without relying on magnets or small point or line contacts, and thus is scalable to large sizes and loads.
e) My positioner does not depend on a specific linear motion technology, or actuator type, and is therefore suitable for applications of varied requirements.
f) My positioner may use many identical parts, as it does not require unique parts for each axis of motion.
g) The platform of my positioner may be supported by multiple flat bearing surfaces and therefore is well suited to handle large loads. The platform of my positioner is also symmetrically supported in a rectangular manner, making it well suited to supporting a rectangular platform.

Thus the reader will see that my positioner in various embodiments provides a solution for applications requiring multi-axis flexibility, accuracy, durability, scalable load capacity, compactness, and moderate cost.

While many very specific design details have been provided in the above description, they should not be construed as limiting the scope of all embodiments, but merely as examples of suitable design details for some embodiments. Instead, the scope of the embodiments should be determined by the appended claims and their legal equivalents.

What is claimed is:

1. A 4-axis positioner comprising:
two 2-axis assemblies, connected or integral to a common frame, spaced a predetermined distance apart, and each comprising:
a fixed assembly, having two sets of linear motion connections disposed in parallel directions;
a first and a second input assembly, each having a primary and a secondary set of linear motion connections, with the secondary set of connections disposed at a predetermined angle, non-parallel from the primary set of connections;
a translation assembly, having a first and a second set of linear motion connections, the first set of connections disposed non-parallel from the second set of connections, and the first set of connections on the translation assembly being aligned in angle with the secondary set of linear motion connections of the first input assembly, and the second set of connections on said translation assembly being aligned in angle with the secondary set of linear motion connections on the second input assembly;
wherein each input assembly is slidably connected to the fixed assembly by means of the input primary sets of linear motion connections, and;
wherein the direction of the slidable connection between the first input assembly and the fixed assembly is parallel with the direction of the slidable connection between the second input assembly and the fixed assembly, and;
wherein each input assembly is provided with independent means of linear actuation with respect to the fixed assembly;
wherein the input assemblies are disposed so that the direction of the first input assemblies' secondary set of linear motion connections is non-parallel from the direction of the second input assemblies' secondary set of linear motion connections, and;
wherein the first set of linear motion connections of the translation assembly is slidably connected to the secondary set of linear motion connections of the first input assembly, and the second set of linear motion connections of the translation assembly is slidably connected to the secondary set of linear motion connections of the second input assembly;
whereby the translational assembly may be translated in two axes, one axis of motion achieved by actuation of the input assemblies in the same direction, and a second axis of motion achieved by actuation of the input assemblies in opposing directions;
a platform, spanning between the two 2-axis assemblies, and connected to the translation assembly of each by means of connections able to accommodate rotation;
whereby said platform may be caused to translate in two axes by motion of the translation assemblies in the same direction, and may be caused to rotate in two axes by motion of the translation assemblies in opposing directions.

2. The positioner of claim 1, wherein the input assemblies are substantially rhomboid in shape.

3. The positioner of claim 1, wherein within each 2-axis assembly, ene both input assemblies' linear connections occupy the same plane of motion.

4. The positioner of claim 1, wherein one input assemblies' secondary linear connections are disposed in a vertically mirrored arrangement from the other input assemblies' secondary connections.

5. The positioner of claim 1, wherein the platform is connected to the first translation assembly by means of a two-degree-of-freedom joint, and connected to the second translation assembly by means of a two-rotational, single-linear degree of freedom joint.

* * * * *